United States Patent
Chang et al.

(10) Patent No.: US 12,541,924 B2
(45) Date of Patent: Feb. 3, 2026

(54) IMAGE COMPOSITION METHOD AND IMAGE COMPOSITION SYSTEM

(71) Applicant: Acer Incorporated, New Taipei (TW)

(72) Inventors: Bo-Cheng Chang, New Taipei (TW); Liang-Chi Chen, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 182 days.

(21) Appl. No.: 18/618,051

(22) Filed: Mar. 27, 2024

(65) Prior Publication Data
US 2025/0118024 A1    Apr. 10, 2025

(30) Foreign Application Priority Data
Oct. 4, 2023  (TW) .................................. 112138018

(51) Int. Cl.
| | | |
|---|---|---|
| *G06T 17/20* | (2006.01) | |
| *G06T 5/50* | (2006.01) | |
| *G06T 7/12* | (2017.01) | |
| *G06V 40/20* | (2022.01) | |

(52) U.S. Cl.
CPC ................ *G06T 17/20* (2013.01); *G06T 5/50* (2013.01); *G06T 7/12* (2017.01); *G06V 40/20* (2022.01); *G06T 2207/20221* (2013.01); *G06T 2207/30196* (2013.01)

(58) Field of Classification Search
None
See application file for complete search history.

(56) References Cited

U.S. PATENT DOCUMENTS

| | | |
|---|---|---|
| 9,547,802 B2 | 1/2017 | Tseng |
| 11,037,321 B2 | 6/2021 | Stokking |
| 2018/0068488 A1* | 3/2018 | Hart ...................... G06T 19/006 |
| 2021/0142581 A1 | 5/2021 | Molyneaux |

FOREIGN PATENT DOCUMENTS

| | | |
|---|---|---|
| CN | 109997175 A | 7/2019 |
| CN | 111243025 A | 6/2020 |
| TW | 201525934 A | 7/2015 |

OTHER PUBLICATIONS

Chinese language office action dated Apr. 12, 2024, issued in application No. TW 112138018.

* cited by examiner

*Primary Examiner* — Yanna Wu
(74) *Attorney, Agent, or Firm* — McClure, Qualey & Rodack, LLP

(57) ABSTRACT

An image composition solution, designed to correct the scale relationship between a person and a 3D virtual scene, is provided. The correction is achieved by adjusting the position of the virtual camera for capturing the person in the virtual world to match the position of the real-world camera. As a result, the disproportionate appearance of the person in the composite image, whether too large or too small, is eliminated, significantly enhancing the coherence and naturalness of the image.

20 Claims, 9 Drawing Sheets

IMAGE COMPOSITION METHOD AND IMAGE COMPOSITION SYSTEM

CROSS REFERENCE TO RELATED APPLICATIONS

This application claims priority of Taiwan Patent Application No. 112138018, filed on Oct. 4, 2023, the entirety of which is incorporated by reference herein.

BACKGROUND OF THE INVENTION

Field of the Invention

The present invention relates to image processing technologies, and, in particular, to an image composition method and an image composition system.

Description of the Related Art

Currently, there are numerous video-related software applications available on the market, serving various purposes, such as video conferencing software like Zoom, Microsoft Teams, and Google Meet, as well as live streaming software like Twitch, YouTube Live, and Open Broadcaster Software (OBS). These software applications, in addition to their basic video transmission functionality, also have auxiliary image processing features, such as background blur, autofocus, face detection, and background replacement. Among these functions, the traditional background replacement feature typically uses 2D images as replacement targets. Its advantages include allowing users to choose their preferred background images for customization purposes, as well as obscuring the user's current real-world environment to maintain personal privacy. However, its disadvantages include a lack of integration between the person and the 2D background image, as the person is a 3D entity. Additionally, 2D background images lack dynamic changes (such as the inability to change viewing angles or alter the relative position of the person in the background), resulting in a monotonous appearance.

Considering the advantages and disadvantages mentioned above, there is an expected market demand for applications that use 3D virtual scenes as backgrounds. This is because, compared to applications that use 2D images as backgrounds, they can better integrate persons into the background and present more visually rich and engaging effects. Moreover, allowing users to customize virtual scenes, such as scenes from their favorite games, significantly enhances the user experience.

In the development of the aforementioned applications that use 3D virtual scenes as backgrounds, various technologies may be involved, including real-time image background removal, virtual scene creation, conversion from 3D scenes to 2D images, and overlaying of "person images" onto virtual scenes. One technical challenge encountered in this process is the issue of dimension adaptation between the person and the scene. Ignoring or inadequately addressing this issue can lead to situations such as those illustrated in FIGS. 1A and 1B. FIGS. 1A and 1B depict two types of composite images with disproportionate proportions between the person and the scene. It is evident that in FIG. 1A, the person 10A appears disproportionately larger relative to the background scene, while in FIG. 1B, the person 10B appears disproportionately smaller relative to the background scene. Both of these composite images create a jarring impression for the user.

Therefore, a solution for image composition is needed to overcome the aforementioned technical challenges.

BRIEF SUMMARY OF THE INVENTION

An embodiment of the present disclosure provides an image composition method implemented by a computer system. The method includes acquiring a person image-which is an image of a person-captured by a camera device. The method further includes generating a 3D virtual scene based on multiple virtual scene resources, and setting a reference object in the 3D virtual scene. The reference object has the same actual dimension as the person. The method further includes setting a first virtual camera to face the reference object in the 3D virtual scene. The method further includes determining the ideal position of the first virtual camera based on the first distance between the camera device and the person when capturing the person image. The method further includes moving the first virtual camera to the ideal position, and projecting the 3D virtual scene onto a virtual scene layer using the first virtual camera located at the ideal position. The method further includes separating the person layer from the person image using an image segmentation model. The method further includes overlaying the person layer onto the virtual scene layer to generate a pair of overlaid layers. The method further includes projecting the pair of overlaid layers onto a 2D image using a second virtual camera. The method further includes rendering the 2D image to obtain a composite image.

In an embodiment, the method further includes calculating, based on the person image, a first visual dimension of the person in the person image using an object recognition model. The method further includes calculating the actual dimension based on the first visual dimension, the first distance, and a Field of View parameter of the camera device.

In an embodiment, after determining the ideal position of the first virtual camera and before moving the first virtual camera to the ideal position, the method further includes projecting the 3D virtual scene onto a virtual scene image using the first virtual camera, and calculating the second visual dimension of the reference object in the virtual scene image using the raycasting algorithm. The method further includes determining the correction amount for moving the first virtual camera to the ideal position based on the first visual dimension, the second visual dimension, and the first distance. The step of moving the first virtual camera to the ideal position further includes moving the first virtual camera according to the correction amount.

In an embodiment, the step of determining the correction amount for moving the first virtual camera to the ideal position further includes determining the correction amount for moving the first virtual camera to the ideal position, based on the first visual dimension, the second visual dimension, the first distance, and an offset.

In an embodiment, the method further includes acquiring the first distance from the camera device. The camera device is a depth camera.

In an embodiment, the method further includes estimating the first distance using a depth estimation model based on the person image.

In an embodiment, the method further includes recognizing the gesture in the person image using a gesture recognition model. The method further includes determining whether the gesture maps to a specified operation. The method further includes adjusting the ideal position of the first virtual camera based on the specified operation, in response to determining that the gesture maps to a specified operation.

In an embodiment, the virtual scene resources include a mesh resource, a texture resource, a shader resource, and a material resource.

In an embodiment, the computer system includes the camera device.

In an embodiment, the computer system is connected to a mobile device that includes the camera device.

An embodiment of the present disclosure provides an image composition system that includes a storage device and a processing device. The processing device loads a program from the storage device to execute the following steps. The processing device acquires a person image of a person captured by a camera device. The processing device generates a 3D virtual scene based on multiple virtual scene resources, and sets a reference object in the 3D virtual scene. The reference object has the same actual dimension as the person. The processing device sets a first virtual camera to face the reference object in the 3D virtual scene. The processing device determines the ideal position of the first virtual camera based on the first distance between the camera device and the person when capturing the person image. The processing device moves the first virtual camera to the ideal position, and projects the 3D virtual scene onto a virtual scene layer using the first virtual camera located at the ideal position. The processing device separates the person layer from the person image using an image segmentation model. The processing device overlays the person layer onto the virtual scene layer to generate a pair of overlaid layers. The processing device projects the pair of overlaid layers onto a 2D image using a second virtual camera. The processing device renders the 2D image to obtain a composite image.

The image composition solution disclosed herein adjusts the position of the virtual camera to ensure its alignment with the position of the real-world camera, thereby achieving proportion correction to overcome the dimension adaptation issue between the person and the 3D virtual scene, and producing a more natural and cohesive visual effect in the composite image. As a result, the disproportionate appearance of the person in the composite image, whether too large or too small, is eliminated, significantly enhancing the coherence and naturalness of the image.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

In each of the following embodiments, the same reference numbers represent identical or similar elements or components.

It must be appreciated that the terms "including" and "comprising" are used in the specification to indicate the existence of specific technical features, numerical values, method steps, process operations, elements and/or components, but do not exclude additional technical features, numerical values, method steps, process operations, elements, components, or any combination of the above.

Ordinal terms used in the claims, such as "first," "second," "third," etc., are only for convenience of explanation, and do not imply any precedence relation between one another.

It should be clarified that the term "dimension" is often used to roughly describe the size of an object in space, but in this document, the term "dimension" specifically refers to the measurement of an object in a particular direction, such as length, width, height, depth, or diameter.

The descriptions of embodiments relating to devices or systems below are also applicable to embodiments of methods, and vice versa.

In 3D imaging technology, a virtual camera system is commonly used to capture and present 3D scenes. The virtual camera system simulates traditional cameras or eyes in photography, converting 3D scenes into 2D images. As a result, viewers can observe 3D scenes in 2D format and even interact with them. Technically, the virtual cameras in the virtual camera system do not capture scenes from the real world like conventional cameras do; instead, they use 3D projection techniques to map scenes captured from the virtual world onto 2D images.

The 3D projection technique typically includes orthographic projection and perspective projection. In orthographic projection, the dimension of objects in the image is not affected by the distance between the camera and the object. Regardless of the distance between the object and the camera, the dimension of the object remains constant in the image. In perspective projection, the distance between the camera and the object affects the dimension of the object in the image. Specifically, the closer the object is to the camera, the larger it appears in the image. To reflect the perspective changes caused by the distance of objects in the real world, both conventional cameras and virtual cameras typically use perspective projection.

Figure 1A:
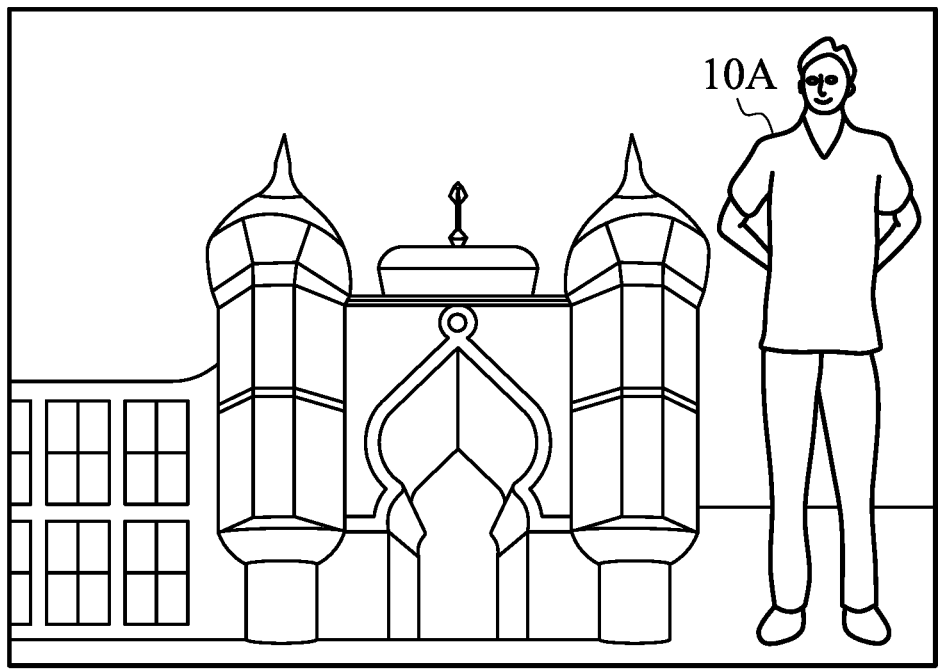
FIG. 1A illustrates the composite image where the person appears disproportionately larger relative to the background scene.
Figure 1B:
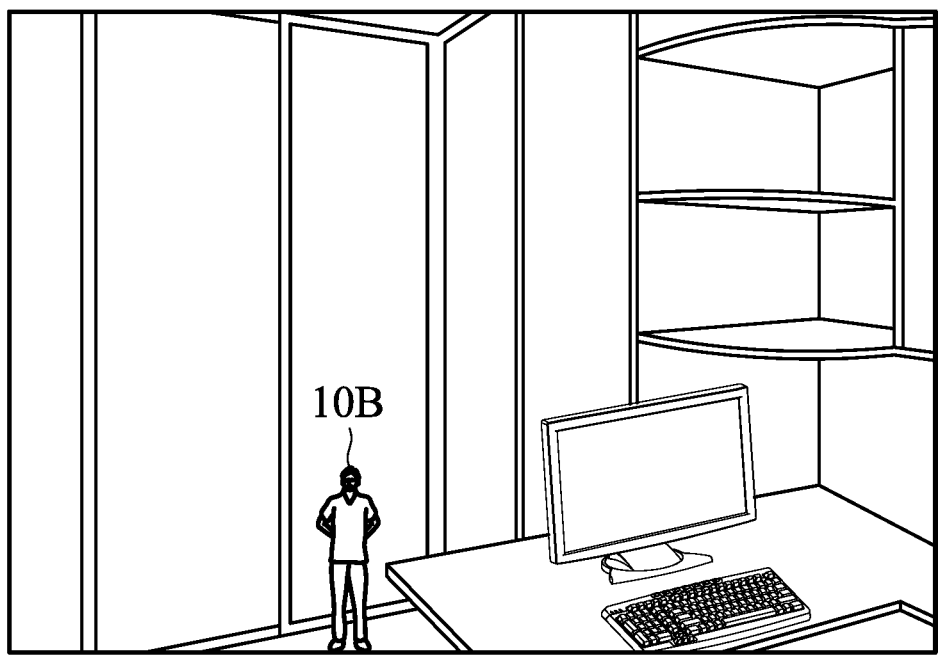
FIG. 1B illustrates the composite image where the person appears disproportionately smaller relative to the background scene.

Therefore, the issue of disproportionate proportions between the person and the scene depicted in FIGS. 1A and 1B is caused by the imbalance in the shooting distances between the conventional camera in the real world and the virtual camera in the virtual world. In FIG. 1A, the disproportionately large appearance of person 10A relative to the background scene is due to the camera capturing the person being relatively closer to the person, while the virtual camera captures the virtual scene from a relatively farther distance. In FIG. 1B, the disproportionately small appearance of person 10B relative to the background scene is due to the camera capturing the person being relatively farther from the person, while the virtual camera captures the virtual scene from a relatively closer distance.

The image composition solution disclosed herein aims to correct the proportion relationship between the person and the 3D virtual scene. The correction is achieved by adjusting the position of the virtual camera in the virtual world to align with the position of the real-world camera. The principle utilized is that if two target objects of the same actual dimension have the same visual dimension in the images captured by two cameras (whether conventional or virtual), then the distance between each camera and its respective target object must be the same. On the other hand, if the distances between each camera and its respective target object are the same, and the actual dimension of the two target objects are also the same, then the two target objects will have the same visual dimension in the images captured by the two cameras.

The above image composition solution will be further explained with reference to FIGS. 2A and 2B.

Figure 2A:
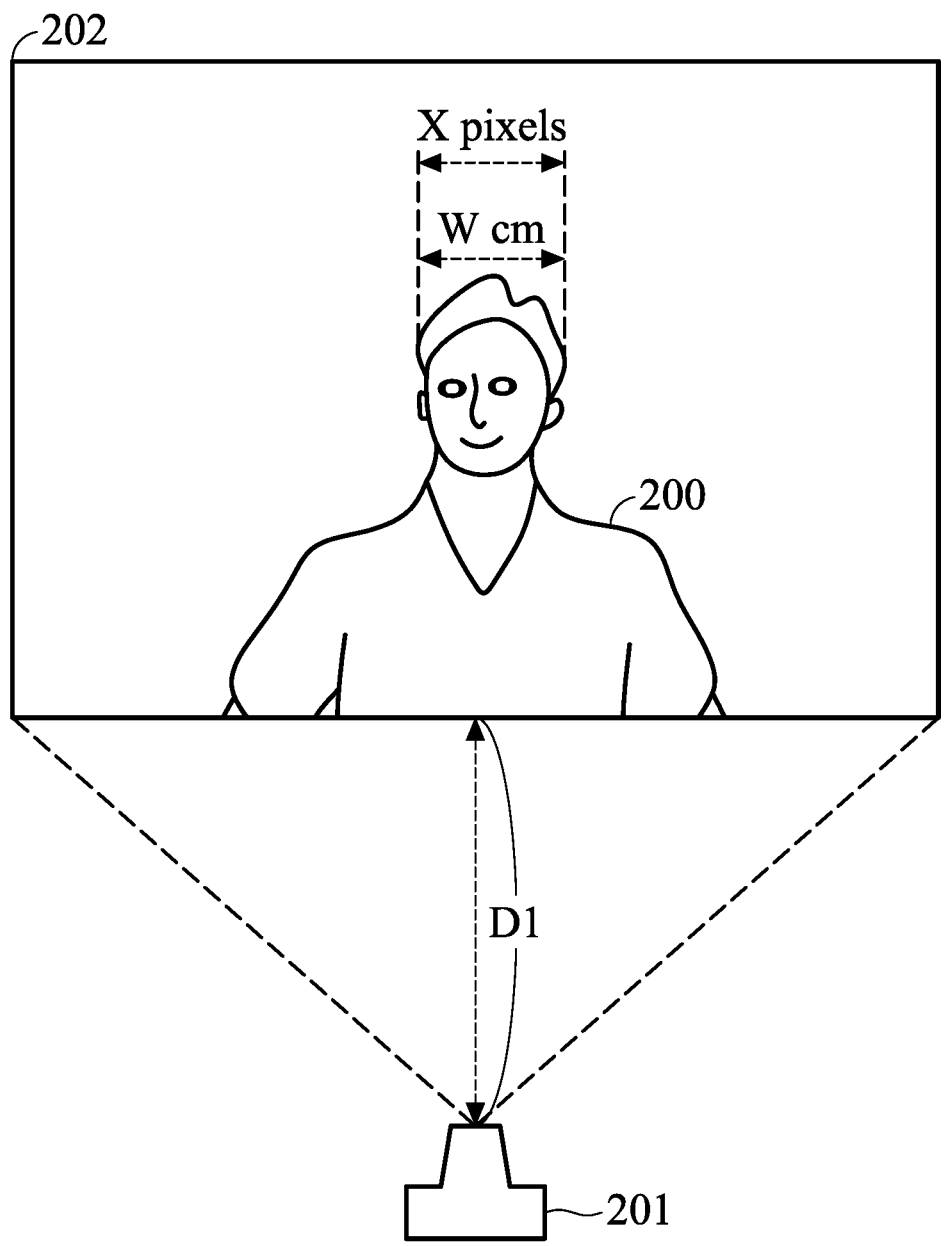
FIG. 2A is a schematic diagram illustrating a scenario in the real world where a person image of a person is captured by a camera, according to an embodiment of the present disclosure.

FIG. 2A is a schematic diagram illustrating a scenario in the real world where a person image 202 of a person 200 is captured by a camera 201, according to an embodiment of the present disclosure. As shown in FIG. 2A, the distance between the camera 201 and the person 200 when capturing the person image 202, hereinafter referred to as the "first distance," is denoted as D1. The dimension of the person 200 in the real world, hereinafter referred to as the "actual dimension," is denoted as W centimeters. The dimension of the person 200 in the person image 202 captured by the camera 201, hereinafter referred to as the "first visual dimension," is denoted as X pixels. It should be appreciated that although in FIG. 2A, the actual dimension W centimeters of the person 200 appears to be equivalent to the first visual dimension X pixels, these are completely different concepts and should not be considered comparable quantities. The actual dimension is the measurement of the person 200 in a specific direction in the real world, such as the width of the person 200's head. The first visual dimension, on the other hand, is the number of pixels occupied by the person 200 (such as the width of the head) in the person image 202 or on the screen.

Figure 2B:
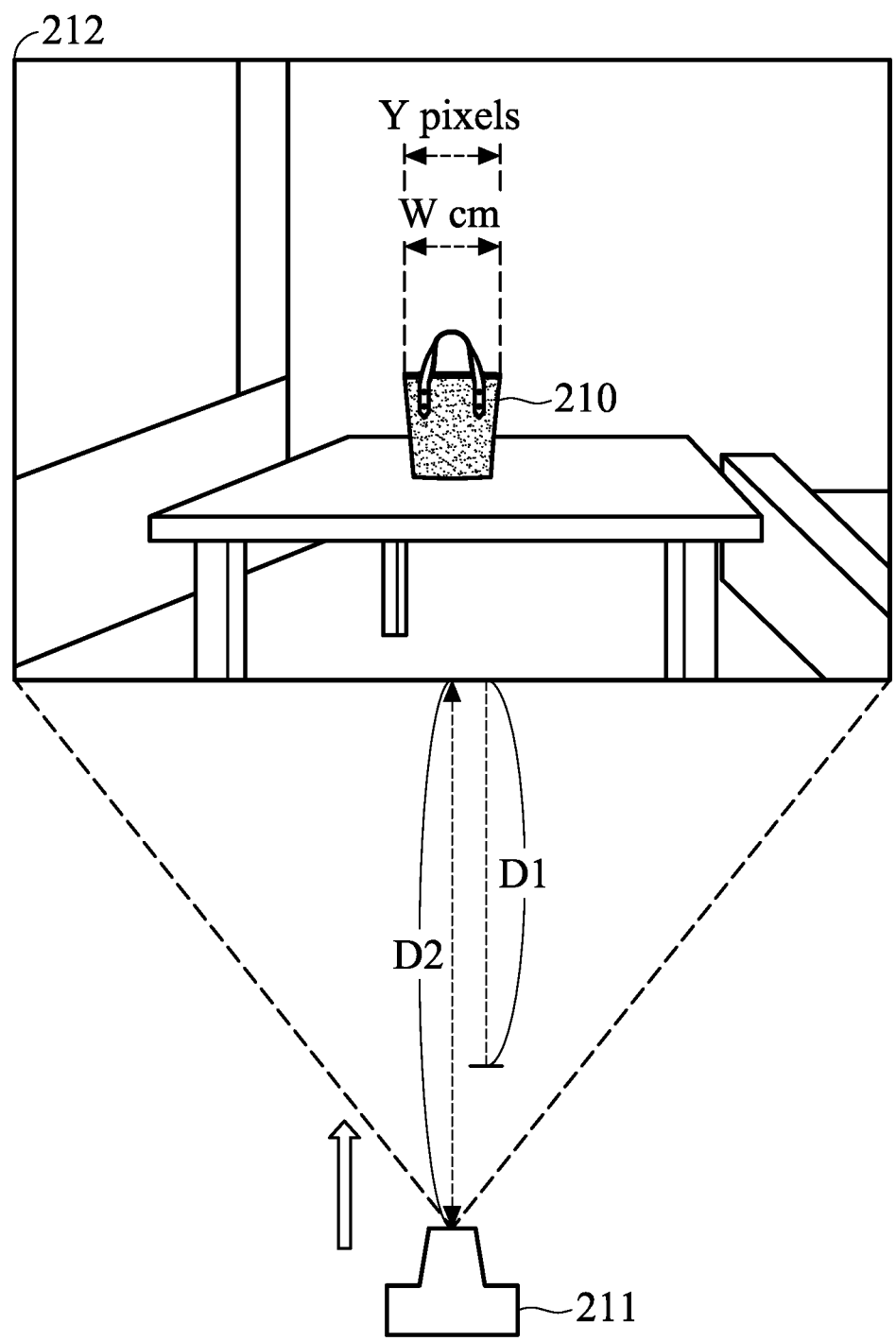
FIG. 2B is a schematic diagram illustrating a scenario in the virtual world where a 3D virtual scene is captured by a virtual camera, according to an embodiment of the present disclosure.

FIG. 2B is a schematic diagram illustrating a scenario in the virtual world where a 3D virtual scene 212 is captured by a virtual camera 211, according to an embodiment of the present disclosure. As shown in FIG. 2B, a reference object 210 is placed in the 3D virtual scene 212. Objects in the 3D virtual scene 212 can be created using 3D modeling tools such as Autodesk Maya, Blender, Autodesk 3ds Max, Cinema 4D, among others. These modeling tools have the capability to simulate real-world scale, ensuring that objects and scenes in the 3D virtual scene 212 have dimensions and proportions consistent with the real world. Therefore, in embodiments disclosed herein, the reference object 210 can be set to have the same actual dimension (e.g., the width of the reference object 210 itself) as the person 200 in the real world, denoted as W centimeters. Additionally, the virtual camera 211 can be configured to face the reference object 210.

Since the reference object 210 and the person 200 have the same actual dimension, if the distance between the virtual camera 211 and the reference object 210, hereinafter referred to as the "second distance," is equal to the first distance between the camera 201 and the person 200, then the dimension of the reference object 210 in the image projected by the virtual camera 211 onto the 3D virtual scene 212, hereinafter referred to as the "second visual size," will also be equal to the first visual dimension of the person 200 in the person image 202. At this moment, the proportion between the person 200 and the 3D virtual scene 212 is harmonious, and the result of the image composition will not exhibit situations like those depicted in FIG. 1A or 1B.

However, in the example depicted in FIG. 2B, it is assumed that the second distance D2 between the virtual camera 211 and the reference object 210 is greater than the first distance D1 between the camera 201 and the person 200. That is, the shooting distance of the virtual camera 211 is farther compared to the shooting distance of the camera 201. Therefore, the second visual dimension Y pixels of the reference object 210 will be smaller than the first visual dimension X pixels of the person 200. At this moment, the person 200 appears disproportionately larger relative to the 3D virtual scene 212, and the result of image composition may resemble the situation depicted in FIG. 1A.

According to embodiments disclosed herein, the issue with the FIG. 2B scenario can be addressed by shortening the second distance between the virtual camera 211 and the reference object 210, making it equal to or approximately equal to the first distance D1. As for the first distance D1, it can be obtained by using a depth estimation model to estimate the depth of each pixel in the person image 202, or by using a depth camera as the camera 201 to measure the depth of the person 200.

Figure 3:
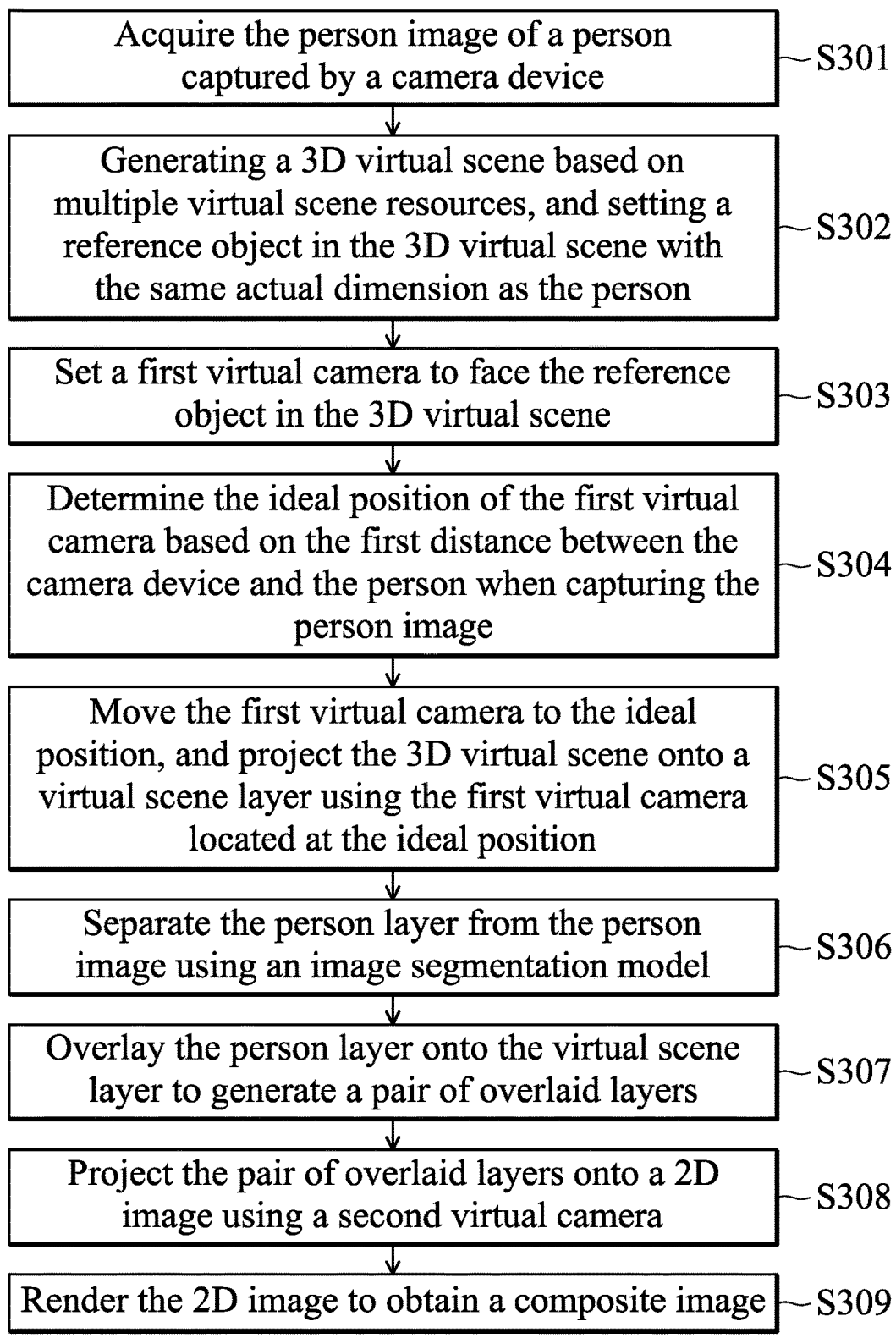
FIG. 3 illustrates a flow diagram of an image composition method, according to an embodiment of the present disclosure.

FIG. 3 illustrates a flow diagram of an image composition method 300 according to an embodiment of the present disclosure. As shown in FIG. 3, the method 300 may include steps S301-S309.

In step S301, the person image of the person captured by the camera device is obtained. Taking FIG. 2A as an example, the person image 202 of the person 200 captured by the camera 201 is obtained.

In step S302, a 3D virtual scene is generated based on multiple virtual scene resources, and a reference object is set in the 3D virtual scene with the same actual dimension as the person. Taking FIG. 2B as an example, the 3D virtual scene 212 is generated based on multiple virtual scene resources, and a reference object 210 with the same actual dimension W centimeters as the person 200 in FIG. 2A is set in the 3D virtual scene 212.

In an embodiment, step S302 can be implemented by calling the application programming interface (API) provided by a graphics engine. The graphics engine could be, for example, Unity, Unreal Engine, OpenGL, DirectX, Vulkan, Metal, etc., but the present disclosure is not limited thereto.

In an embodiment, the virtual scene resources used to generate the 3D virtual scene in step S302 may include mesh resources, texture resources, shader resources, and material resources. Mesh resources are composed of multiple vertices, edges, and faces, defining the dimension, shape, and topological structure of 3D objects (including the reference object). Texture resources are 2D images or patterns applied to the surface of 3D objects, typically stored in image file formats (e.g., JPEG, PNG, or TGA), containing information such as color textures, normal maps, and environment mapping, used for adding color, texture, and visual effects to the surface of objects. Shader resources are programs for controlling the effects of light on the surface of objects and their visual appearance, including illumination, shadows, reflections, refractions, etc. Material resources are collections of physical properties of materials (e.g., metal, plastic, or wood) used by objects in the virtual scene, defining the optical characteristics of objects, such as color, reflection, and transparency.

In step S303, a first virtual camera is set to face the reference object in the 3D virtual scene. Taking the example of FIG. 2B, the virtual camera 211 is set to face the reference object 210 in the 3D virtual scene 212.

In step S304, the ideal position of the first virtual camera is determined based on the first distance between the camera device and the person when capturing the person image. Taking FIGS. 2A and 2B as examples, the ideal position of the virtual camera 211 is determined based on the first distance D1 between the camera 201 and the person 200 when capturing the person image 202.

In an embodiment, the ideal position mentioned above is equivalent to the position at the first distance from the reference object. In another embodiment, it is desired that the person and the reference object are not in exactly the same position but have a certain reasonable degree of offset, and thus the ideal position can be set at a distance from the person equal to the first distance plus an offset amount. This offset amount can be a default value or determined based on user settings, but the present disclosure is not limited thereto.

In step S305, the first virtual camera is moved to the ideal position, and the 3D virtual scene is projected onto a virtual scene layer using the first virtual camera located at the ideal position. That is, based on the parameters associated with the first virtual camera, the 3D virtual scene captured from the virtual world is mapped onto a 2D virtual scene layer using 3D projection techniques.

In step S306, the person layer is separated from the person image using an image segmentation model. The segmentation model can be implemented by various well-known machine learning algorithms designed to segment different objects (such as persons) within images, such as U-Net, DeepLab, Mask R-CNN, HRNet, Enet, among others, but the present disclosure is not limited thereto. The training process of the segmentation model involves acquiring labeled data (e.g., manually labeled segmentation results or collecting open-source labeled data), selecting loss functions, and configuring optimization algorithms, which can adopt various well-known supervised learning approaches, but the present disclosure is not limited thereto. Moreover, the segmentation model can be trained locally on the device or trained initially on other computer devices (e.g., servers) and then obtained via networks (e.g., downloaded from the cloud), storage media (e.g., external hard drive), or other communication interfaces (e.g., USB), but the present disclosure is not limited thereto.

In step S307, the person layer is overlaid onto the virtual scene layer to generate a pair of composite layers. The process of overlaying the person layer and the virtual scene layer, may involve various image composition techniques, such as alpha blending, mask blending, raycasting, among others, to ensure that the composite visual effect is realistic and natural, with good overall consistency.

In step S308, the pair of composite layers is projected onto a 2D image using the second virtual camera. That is, based on the parameters associated with the second virtual camera, the pair of composite layers captured by the second virtual camera is mapped onto a 2D image using 3D projection techniques.

In step S309, the 2D image is rendered to obtain the composite image. This step may further involve processes such as ray tracing, shadow generation, ambient lighting, material assignment, among other. The specific implementation of rendering techniques is not limited herein, and different rendering methods and parameter configurations can be selected based on practical requirements.

In an embodiment, the actual dimension (i.e., the dimension of the person in the real world) required for generating the reference object in the 3D virtual scene in step S302 can be a value input by the user. In another embodiment, the average width of a human head, such as 16.5 centimeters, can be used as the actual dimension. Since the average head width varies by gender, for example, the average head width for adult males is approximately between 16.5-18.5 centimeters, and for adult females, it's approximately between 15-16.5 centimeters, a gender recognition model can also be used to determine the gender of the person in the person image, thereby determining the actual dimension. However, besides gender, the actual head width may vary due to complex factors such as race, geographical location, and individual differences. Therefore, the above approach cannot guarantee the accuracy of the actual dimension, which may affect the image composition result.

In a preferred embodiment, the actual dimension required for the reference object in the 3D virtual scene, which is also the dimension of the person in the real world, can be calculated based on the values obtained from the person image. The following will refer to FIG. 4A and FIG. 4B to illustrate this preferred embodiment.

Figure 4A:
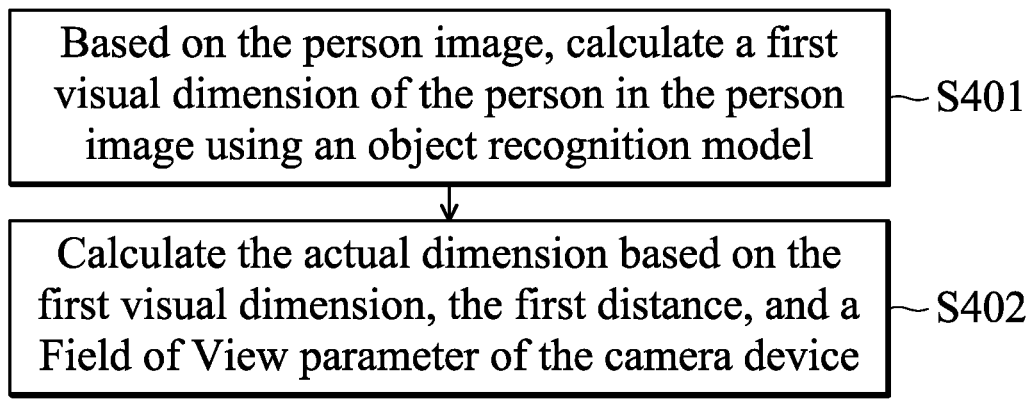
FIG. 4A is a flow diagram illustrating the calculation of the actual dimension, according to a preferred embodiment of the present disclosure.
Figure 4B:
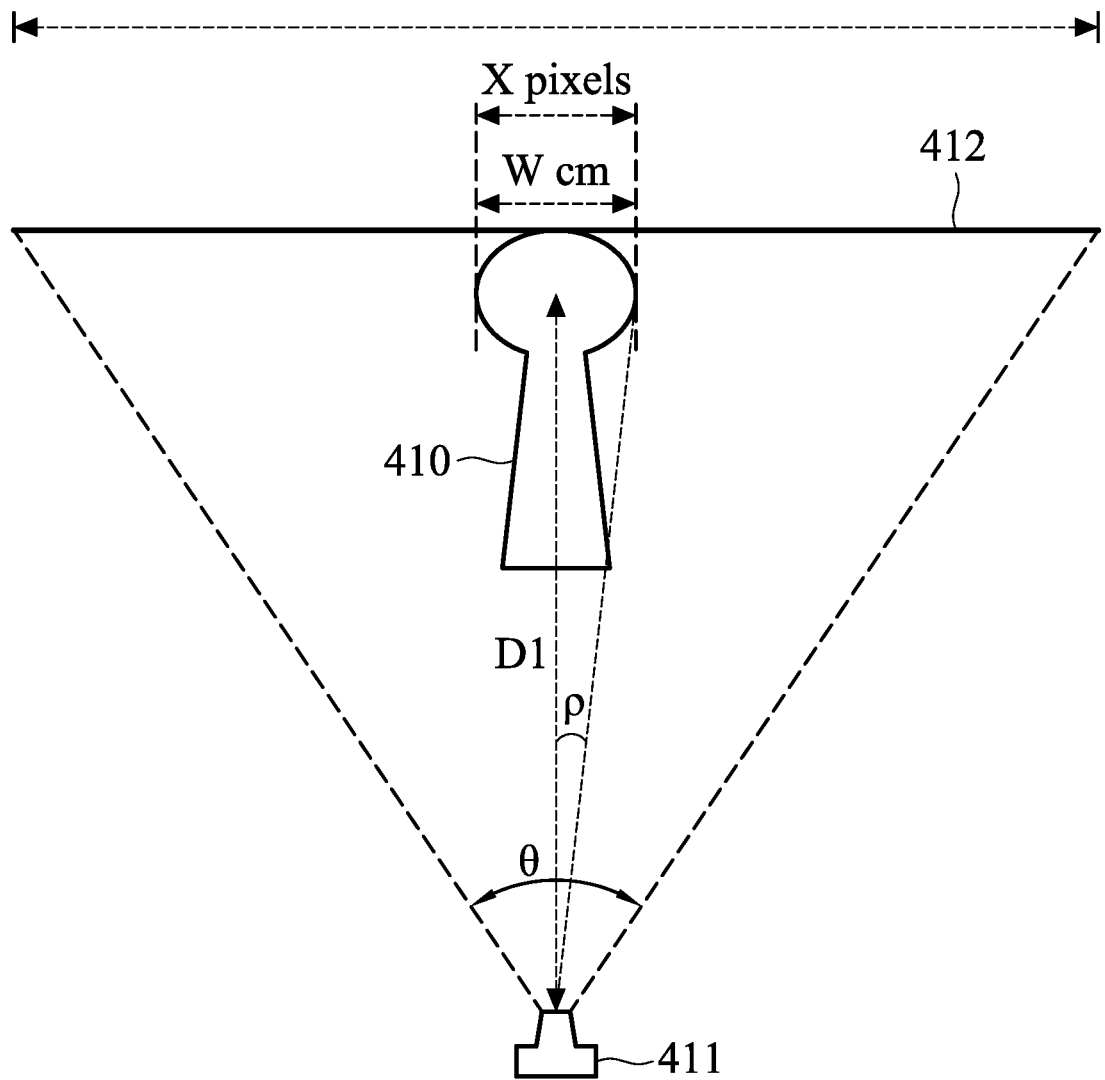
FIG. 4B is a schematic diagram illustrating multiple measurements required for the calculation of the actual dimension, according to a preferred embodiment of the present disclosure.

FIG. 4A is a flow diagram illustrating the calculation of the actual dimension, according to a preferred embodiment of the present disclosure. As shown in FIG. 4A, the calculation of the actual dimension includes steps S401 and S402. Corresponding to the FIG. 4A, FIG. 4B is a schematic diagram illustrating multiple measurements required for the calculation of the actual dimension, according to the preferred embodiment disclosed herein. Please refer to both the FIG. 4A and the FIG. 4B for a better understanding of this preferred embodiment.

In step S401, based on the person image 412, the first visual dimension of the person 410 in the person image 412 is calculated using the object recognition model. In the example shown in the FIG. 4B, the first visual dimension is represented as X pixels.

The inference process of the object recognition model can be roughly divided into two stages: "feature extraction" and "object classification and localization". During the feature extraction stage, the object recognition model extracts features from the person image 412. These features can take the form of feature vectors, feature tensors, or feature maps, representing attributes or characteristics of the person image 412. The features extracted during this stage serve as the input for the object classification and localization stage. In the object classification and localization stage, based on the extracted features, the model performs object classification and localization to identify the person 410 and their position and extent in the person image 412. The information regarding the position and extent of the person 410 can be described using a bounding box, which is a rectangular box that precisely encloses the person 410 in the person image 412. Therefore, the dimensions of the bounding box, such as its length or width, represent the first visual dimension of the person 410 in the person image 412.

The object recognition model can be implemented based on one or more machine learning algorithms and the combination thereof. For example, the model as a whole can use techniques like Region Convolutional Neural Networks (RCNN) or their variations (e.g., Fast R-CNN, Faster R-CNN, Mask R-CNN), or the YOLO (You Only Look Once) series of algorithms. During the feature extraction stage of the inference process, in addition to using convolutional layers and pooling layers of Convolutional Neural Networks (CNNs), non-neural network techniques like the Viola-Jones object detection framework, Scale-invariant feature transform (SIFT), or Histogram of Oriented Gradient (HOG) can also be used. For the object classification and localization stage, fully connected layers of convolutional neural networks or other well-known machine learning algorithms like Support Vector Machine (SVM) or Joint Bayesian, can be used.

In an embodiment, labelled data, serving as the ground truth during the training phase of the object recognition model, can be collected through manual annotation of individuals in multiple person images. In another embodiment, labelled data can be obtained from open-source datasets such as the Pascal VOC dataset or the Common Objects in Context (CoCo) dataset. In further implementations, Generative Adversarial Networks (GANs) can be used to augment the quantity of labelled data.

In an embodiment, during the training phase of the object recognition model, loss functions such as Mean Square Error (MSE), Mean Absolute Error (MAE), or cross-entropy may be used to compute the difference between the output of the symbolic object recognition model and the labelled data, resulting in a loss value. Furthermore, an optimizer can be used to iteratively adjust the parameters of the object recognition model, such as the weights of neural network layers, to minimize the loss value and optimize the object recognition model. Optimizers can be implemented by algorithms such as gradient descent (GD), stochastic gradient descent (SGD), or adaptive moment estimation (Adam). Through iterative feedback and parameter updates, the training process progressively reduces the loss value until it converges to a minimum.

Additionally, the object recognition model can be trained locally on the device, or it can be trained on another computer device (e.g., a server) and then obtained via networks (e.g., downloaded from the cloud), storage media (e.g., external hard drives), or other communication interfaces (e.g., USB), but the present disclosure is not limited thereto.

In step S402, the actual dimension is calculated based on the first visual dimension, the first distance, and the field of view (FoV) of the camera device 411. In the example depicted in FIG. 4B, the first visual dimension is represented as X pixels, the first distance as D1, and the actual dimension to be calculated as W centimeters. Additionally, FIG. 4B also illustrates the maximum view angle of the camera device 411 as θ, the angle formed by the ray emitted from the camera device 411 towards the person 410 as ρ, and the maximum width of the camera device 411 as M pixels. The maximum field of view angle θ and maximum width M pixels can be included in the field of view parameters of the camera device 411, or they can be derived from other field of view parameters of the camera device 411.

From FIG. 4B, the mathematical relationship between the actual dimension W and the angle ρ can be expressed as <Formula I>.

$$W = \tan\rho \times D1 \times 2 \qquad \text{(Formula I)}$$

Furthermore, since the angle is directly proportional to the projection amount, the mathematical relationship between the angle ρ, the maximum angle θ, the first visual dimension X, and the maximum width M can be expressed as <Formula II>.

$$\rho = \left(\frac{X}{M}\right) \times \left(\frac{\theta}{2}\right) \qquad \text{(Formula II)}$$

Combining <Formula I> and <Formula II> yields <Formula III>.

$$W = \tan\left(\frac{X \times \theta}{2M}\right) \times D1 \times 2 \qquad \text{(Formula III)}$$

Figure 5:
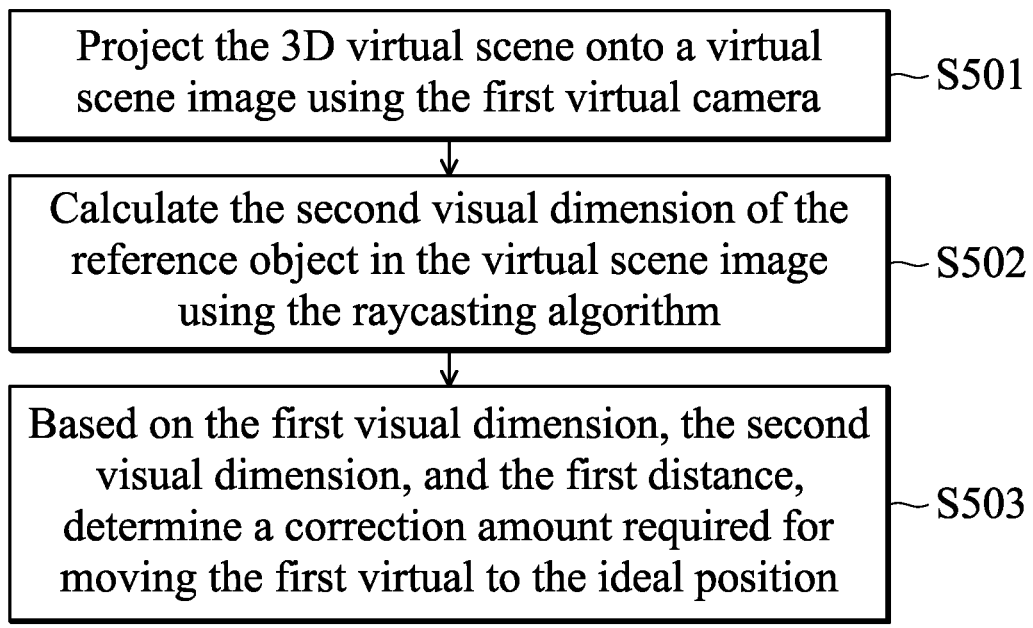
FIG. 5 is a flow diagram illustrating the determination process for the correction amount of the first virtual camera, according to an embodiment of the present disclosure.

In an embodiment, between steps S304 and S305 in FIG. 3, there is an additional process to determine the correction amount of the first virtual camera, as will be elaborated with reference to FIG. 5.

FIG. 5 is a flow diagram illustrating the determination process for the correction amount of the first virtual camera, according to an embodiment of the present disclosure. As shown in FIG. 5, the determination process for the correction amount of the first virtual camera may include steps S501 to S503.

In step S501, the 3D virtual scene is projected onto the virtual scene image using the first virtual camera. That is, based on the parameters associated with the first virtual camera, the 3D projection technique is used to map the 3D virtual scene captured by the first virtual camera in the virtual world onto the 2D virtual scene image. It should be appreciated that since step S501 precedes step S305, at this moment, the first virtual camera has not yet been moved to its ideal position. Therefore, the parameters associated with the first virtual camera are different from those used in step S305, resulting in a different virtual scene image projected compared to the virtual scene layer projected in step S305.

In step S502, the second visual dimension of the reference object in the virtual scene image is calculated using the raycasting algorithm. Taking FIG. 2B as an example, the second visual dimension is denoted as Y pixels.

The raycasting algorithm simulates the line of sight from the first virtual camera, which is the rays emitted from the first virtual camera. By checking whether the rays intersect with the reference object, it determines whether the reference object is in the line of sight of the first virtual camera. When the rays intersect with the object, the projected position and dimension (i.e., the second visual dimension) of the reference object in the virtual camera image can be calculated.

In step S503, the correction amount for moving the first virtual camera to the ideal position is determined based on the first visual dimension, second visual dimension, and the first distance. Taking FIGS. 2A and 2B as examples, where the first visual dimension is represented as X pixels, the second visual dimension as Y pixels, and the first distance as D1, the correction amount is thus calculated as D1-D2. A positive correction value indicates that the first virtual camera should be moved further away from the subject, while a negative value indicates that it should be moved closer.

The mathematical relationship between the first visual dimension X, the second visual dimension Y, the first distance D1, and the second distance D2 can be expressed as <Formula IV>.

$$\frac{X}{D1} = \frac{Y}{D2}$$ (Formula IV)

Based on <Formula IV>, the correction amount can be further expressed as <Formula V>.

$$D1 - D2 = D1 \times \left(1 - \frac{Y}{X}\right)$$ (Formula V)

After the determination process of the correction amount as described above, the subsequent step S305 involves moving the first virtual camera based on the correction amount to bring it to the ideal position. Taking FIG. 2B as an example, the virtual camera 211 can be moved according to the correction amount D1-D2 to position it at the ideal position, which corresponds to the shooting distance of D1.

In an embodiment, it is desired for the person to have a certain reasonable degree of offset from the reference object rather than being in exactly the same position. Therefore, the correction amount calculated should also take into account this offset value. More specifically, the result of D1-D2 calculated using <Formula V> should be further increased by the offset amount to serve as the correction amount. This offset amount can be a default value or can be determined based on user settings, but the present disclosure is not limited thereto.

In an embodiment, the first distance between the camera device and the person in the captured image, such as D1 shown in FIG. 2A or FIG. 4B, can be obtained from the camera device itself. The camera device in this embodiment is a depth camera, such as a Time-of-Flight (ToF) camera, a structured light camera, a stereo vision camera, or similar cameras capable of sensing depth information of objects (including persons).

In an embodiment, the first distance between the camera device and the person when capturing the person image can be estimated using a depth estimation model based on the person image. The depth estimation model can be implemented using algorithms based on convolutional neural networks, but the present disclosure is not limited thereto. The training process of the depth estimation model may involve acquiring labeled data (such as manually labeling depth or collecting labeled data from open sources), selecting a loss function, and configuring optimization algorithms, which can use various known supervised learning approaches, but the present disclosure is not limited thereto. Additionally, the depth estimation model can be trained locally or on another computer devices (e.g., servers) and then obtained via networks (e.g., downloading from the cloud), storage media (e.g., external hard drives), or other communication interfaces (e.g., USB), but the present disclosure is not limited thereto.

In an embodiment, the image composition method provided in the present disclosure further includes recognizing the gesture in the person image using a gesture recognition model, and then determining whether that gesture maps to a specified operation. If the gesture is determined to map to a specified operation, the ideal position of the first virtual camera is adjusted according to that specified operation. For example, a thumb pointing to the left may indicate the user (i.e., the person captured by the camera device) wants to move the first virtual camera to the left (i.e., move the ideal position to the left), while a thumb pointing to the right may indicate the user wants to move the first virtual camera to the right (i.e., move the ideal position to the right). Such mapping relationships between gestures and operations can be predefined and recorded in a mapping table. In response to gestures recorded in the mapping table, corresponding operations can be performed on the first virtual camera.

The gesture recognition model can be implemented using various well-known machine learning algorithms, such as convolutional neural networks (CNN), recurrent neural networks (RNN), long short-term memory networks (LSTM), support vector machines (SVM), decision trees, and random forests, among others, but the present disclosure is not limited thereto. The training process of the gesture recognition model involves acquiring labeled data (e.g., manually labeling gestures or collecting labeled data from open sources), selecting a loss function, and configuring optimization algorithms, which can use various well-known supervised learning methods, but the present disclosure is not limited thereto. Additionally, the gesture recognition model can be trained locally on the device or on another computer devices (e.g., servers) and then obtained via networks (e.g., downloaded from the cloud), storage media (e.g., external hard drives), or other communication interfaces (e.g., USB), but the present disclosure is not limited thereto.

Figure 6A:
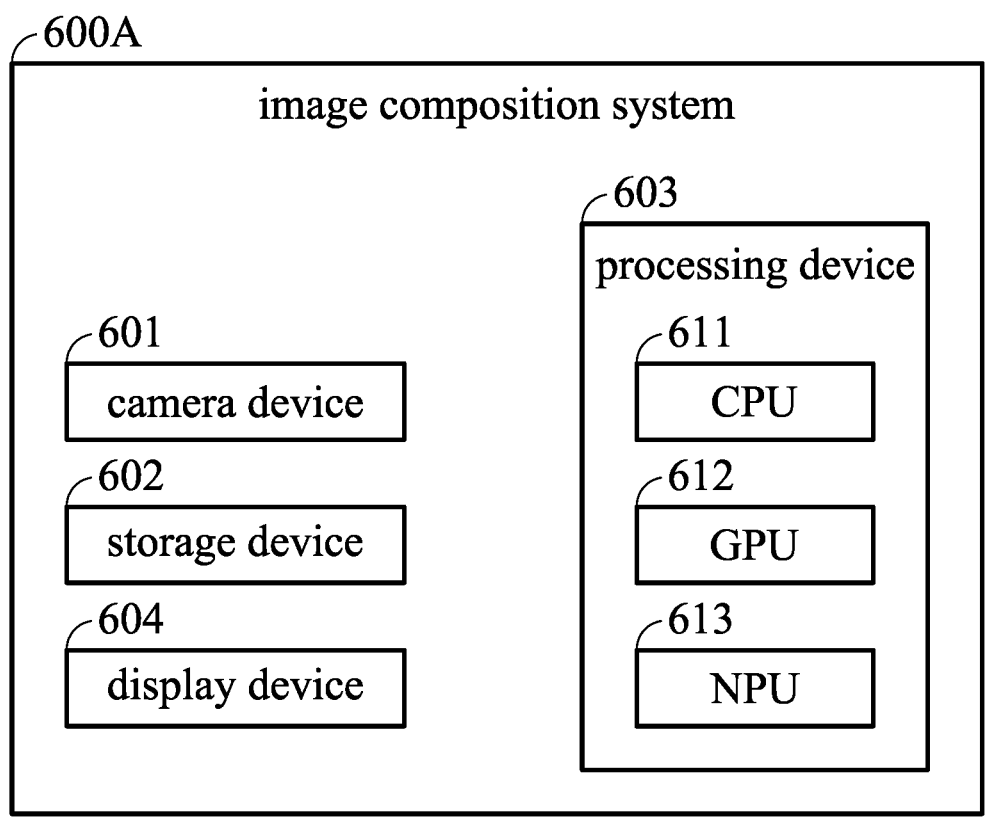
FIG. 6A is a system diagram illustrating an image composition system, according to an embodiment of the present disclosure.

FIG. 6A is a system diagram illustrating an image composition system 600A, according to an embodiment of the present disclosure. As shown in FIG. 6A, the system 600A may include a camera device 601, a storage device 602, a processing device 603, and a display device 604. The system 600A itself can be a personal computer (such as a desktop or laptop computer) or a server running an operating system (e.g., Windows, Mac OS, Linux, UNIX, etc.), or mobile devices such as tablets or smartphones, but the present disclosure is not limited thereto.

The camera device 601 may include a camera lens used for capturing images. The camera lens can include conventional optical lenses or infrared lenses. The type or number of camera lenses are not limited herein. The camera lens can be movable (e.g., rotatable to capture images from different angles) or immovable (e.g., fixed to capture images from a fixed angle). In an embodiment, the camera device 601 can be a depth camera, such as a time-of-flight camera, a structured light camera, or a stereo vision camera, capable of perceiving depth information of objects (including persons), and providing the first distance between the camera device and the person when capturing person images.

The storage device 602 may include volatile memory (e.g., Random Access Memory (RAM), Dynamic Random Access Memory (DRAM), Static Random Access Memory (SRAM)) and/or any one or more types of non-volatile memory (e.g., read-only memory (ROM), electrically-erasable programmable read-only memory (EEPROM), flash memory, non-volatile random access memory (NVRAM)) devices (e.g., hard disk drives (HDDs), solid-state drives (SSDs), or optical disks) and the combination thereof, but the present disclosure is not limited thereto. In various embodiments of the present disclosure, the storage device 602 is used to store programs implementing the aforementioned image composition methods 300 and various embodiments thereof, as well as data required or generated during the execution of the program, such as the aforementioned person images, virtual scene resources, 3D virtual scenes, virtual scene layers, person layers, overlaid layers, composite images, and various machine learning models that may be used.

The processing device 603 may include one or more general-purpose or specialized processors and the combination thereof for executing instructions. The processing device 603 loads the aforementioned program from the storage device 602 to execute the image composition method 300 and various embodiments thereof. The processing device 603 may include a Central Processing Unit (CPU) 611 and a Graphics Processing Unit (GPU) 612. The GPU 612 is specifically designed to perform computer graphics and image processing tasks, making it more efficient than a general-purpose CPU 611 in these areas. Therefore, in various embodiments of the present disclosure, tasks can be allocated according to the characteristics of the CPU 611 and GPU 612, such as assigning tasks related to data acquisition or communication with other devices to the CPU 611, while assigning tasks related to computer graphics and image processing to the GPU 612.

In an embodiment, the processing device 603 may further include a Neural Processing Unit (NPU) 613 specifically optimized for deep learning tasks. Compared to GPU 612, NPU 613 may offer computational advantages in operating the aforementioned image segmentation models, object recognition models, depth estimation models, and/or gesture recognition models. Therefore, in this embodiment, tasks involving the use of these machine learning models can be assigned to the NPU 613.

The processing device 603 can be coupled to the display device 604 to transmit the composite image obtained from executing the image composition method 300 to the display device 604 for display. The display device 604 can be any device for displaying visual information, such as an LCD display, LED display, OLED display, or plasma display, but the present disclosure is not limited thereto.

Figure 6B:
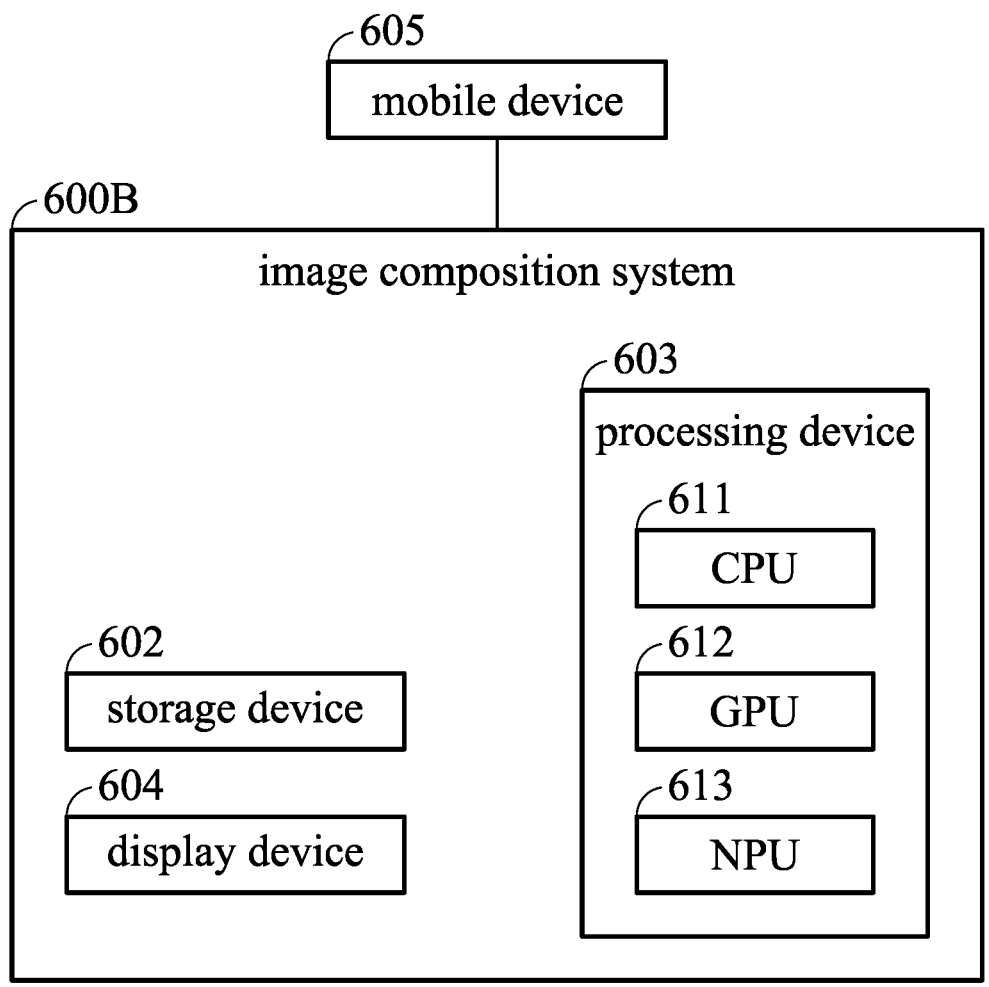
FIG. 6B is a system block diagram illustrating an image composition system 600B, according to another embodiment of the present disclosure.

FIG. 6B is a system block diagram illustrating an image composition system 600B, according to another embodiment of the present disclosure. In contrast to system 600A, system 600B also includes the same storage device 602, processing device 603, and display device 604, so those hardware components are not reiterated. What distinguishes system 600B from system 600A is that it does not need to include a camera device 601; instead, it connects to an external mobile device 605.

In this embodiment, the mobile device 605 can be any type of smartphone or tablet computer that features a camera, enabling it to capture images. The images of individuals can be captured by the mobile device 605 and then provided to system 600B.

The image composition solution disclosed herein adjusts the position of the virtual camera to ensure its alignment with the position of the real-world camera, thereby achieving proportion correction to overcome the dimension adaptation issue between the person and the 3D virtual scene, and producing a more natural and cohesive visual effect in the composite image. As a result, the disproportionate appearance of the person in the composite image, whether too large or too small, is eliminated, significantly enhancing the coherence and naturalness of the image.

The above paragraphs are described with multiple aspects. Obviously, the teachings of the specification may be performed in multiple ways. Any specific structure or function disclosed in examples is only a representative situation. According to the teachings of the specification, it should be noted by those skilled in the art that any aspect disclosed may be performed individually, or that more than two aspects could be combined and performed.

While the invention has been described by way of example and in terms of the preferred embodiments, it should be appreciated that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image composition method, implemented by a computer system, comprising:
   acquiring a person image of a person captured by a camera device;
   generating a 3D virtual scene based on multiple virtual scene resources, and setting a reference object in the 3D virtual scene, wherein the reference object and the person have a same actual dimension;
   setting a first virtual camera to face the reference object in the 3D virtual scene;
   determining an ideal position of the first virtual camera based on a first distance between the camera device and the person when capturing the person image;
   moving the first virtual camera to the ideal position, and projecting the 3D virtual scene onto a virtual scene layer using the first virtual camera located at the ideal position;
   separating a person layer from the person image using an image segmentation model;
   overlaying the person layer onto the virtual scene layer to generate a pair of overlaid layers;
   projecting the pair of overlaid layers onto a 2D image using a second virtual camera; and
   rendering the 2D image to obtain a composite image.

2. The method as claimed in claim 1, further comprising:
   calculating, based on the person image, a first visual dimension of the person in the person image using an object recognition model; and
   calculating the actual dimension based on the first visual dimension, the first distance, and a Field of View parameter of the camera device.

3. The method as claimed in claim 2, wherein after determining the ideal position of the first virtual camera and before moving the first virtual camera to the ideal position, the method further comprises:
   projecting the 3D virtual scene onto a virtual scene image;
   calculating a second visual dimension of the reference object in the virtual scene image using a raycasting algorithm; and
   determining a correction amount for moving the first virtual camera to the ideal position based on the first visual dimension, the second visual dimension, and the first distance,
   wherein moving the first virtual camera to the ideal position further comprises:
   moving the first virtual camera according to the correction amount.

4. The method as claimed in claim 3, wherein determining the correction amount for moving the first virtual camera to the ideal position further comprises:
   determining the correction amount for moving the first virtual camera to the ideal position based on the first visual dimension, the second visual dimension, the first distance, and an offset.

5. The method as claimed in claim 1, further comprising:
   acquiring the first distance from the camera device, wherein the camera device is a depth camera.

6. The method as claimed in claim 1, further comprising:
   estimating, based on the person image, the first distance using a depth estimation model.

7. The method as claimed in claim 1, further comprising:
   recognizing a gesture in the person image using a gesture recognition model;
   determining whether the gesture maps to a specified operation; and
   in response to determining that the gesture maps to a specified operation, adjusting the ideal position of the first virtual camera based on the specified operation.

8. The method as claimed in claim 1, wherein the virtual scene resources comprise a mesh resource, a texture resource, a shader resource, and a material resource.

9. The method as claimed in claim 1, wherein the computer system comprises the camera device.

10. The method as claimed in claim 1, wherein the computer system is connected to a mobile device that comprises the camera device.

11. An image composition system, comprising a storage device and a processing device, wherein the processing device loads a program from the storage device to execute steps as follows:
   acquiring a person image of a person captured by a camera device;
   generating a 3D virtual scene based on multiple virtual scene resources, and setting a reference object in the 3D virtual scene, wherein the reference object and the person have a same actual dimension;
   setting a first virtual camera to face the reference object in the 3D virtual scene;
   determining an ideal position of the first virtual camera based on a first distance between the camera device and the person when capturing the person image;
   moving the first virtual camera to the ideal position, and projecting the 3D virtual scene onto a virtual scene layer using the first virtual camera located at the ideal position;
   separating a person layer from the person image using an image segmentation model;
   overlaying the person layer onto the virtual scene layer to generate a pair of overlaid layers;
   projecting the pair of overlaid layers onto a 2D image using a second virtual camera; and
   rendering the 2D image to obtain a composite image.

12. The system as claimed in claim 11, wherein the processing device further executes steps as follows:
   calculating, based on the person image, a first visual dimension of the person in the person image using an object recognition model; and
   calculating the actual dimension based on the first visual dimension, the first distance, and a Field of View parameter of the camera device.

13. The system as claimed in claim 12, wherein after determining the ideal position of the first virtual camera and before moving the first virtual camera to the ideal position, the processing device further executes:
   projecting the 3D virtual scene onto a virtual scene image;
   calculating a second visual dimension of the reference object in the virtual scene image using a raycasting algorithm; and
   determining a correction amount for moving the first virtual camera to the ideal position based on the first visual dimension, the second visual dimension, and the first distance;
   wherein the processing device moves the first virtual camera according to the correction amount.

14. The system as claimed in claim 13, wherein the processing device determines the correction amount for moving the first virtual camera to the ideal position based on the first visual dimension, the second visual dimension, the first distance, and an offset.

15. The system as claimed in claim 11, wherein the processing device acquires the first distance from the camera device, wherein the camera device is a depth camera.

16. The system as claimed in claim 11, wherein the processing device further estimates, based on the person image, the first distance using a depth estimation model.

17. The system as claimed in claim 11, wherein the processing device further executes:
   recognizing a gesture in the person image using a gesture recognition model;
   determining whether the gesture maps to a specified operation; and
   in response to determining that the gesture maps to a specified operation, adjusting the ideal position of the first virtual camera based on the specified operation.

18. The system as claimed in claim 11, wherein the virtual scene resources comprise a mesh resource, a texture resource, a shader resource, and a material resource.

19. The system as claimed in claim 11, wherein the computer system comprises the camera device.

20. The system as claimed in claim 11, wherein the computer system is connected with a mobile device that comprises the camera device.

* * * * *